No. 692,456. Patented Feb. 4, 1902.
S. E. KIEROLF.
PEA HARVESTER.
(Application filed Oct. 11, 1900.)
(No Model.) 4 Sheets—Sheet 1.
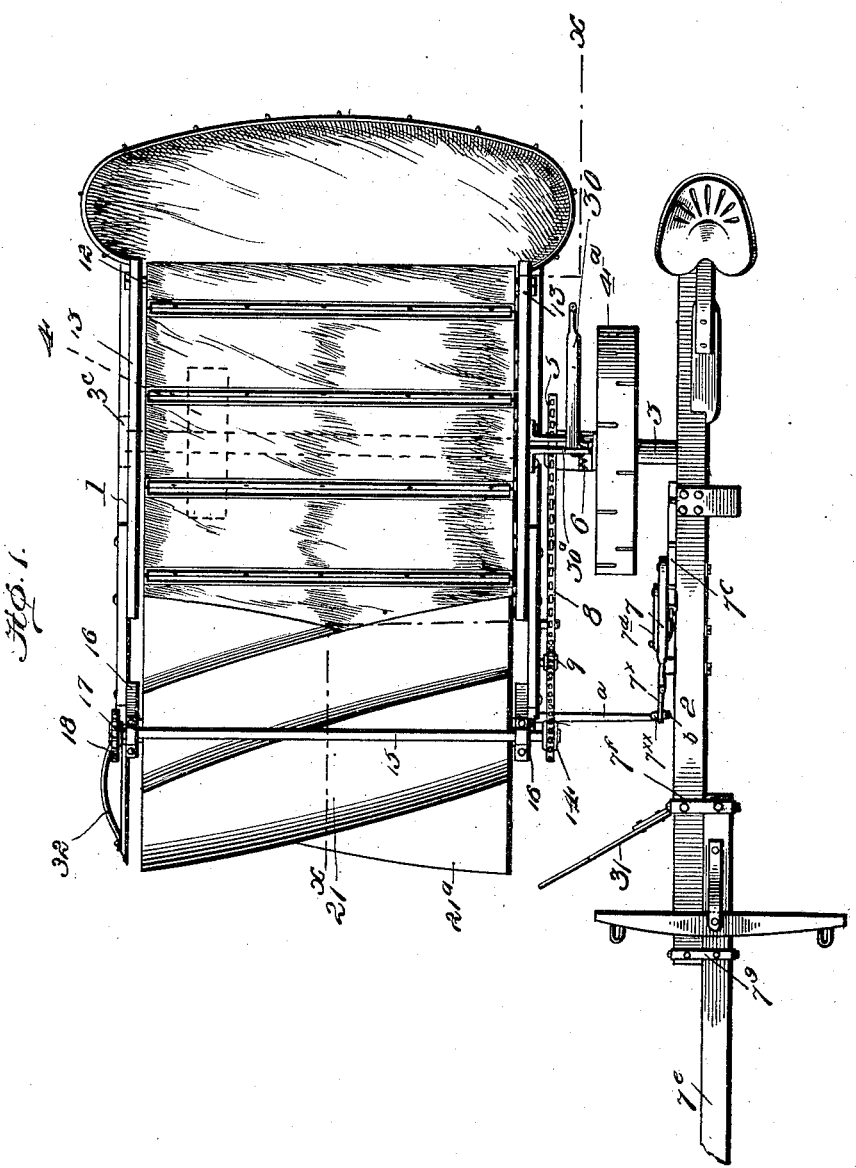

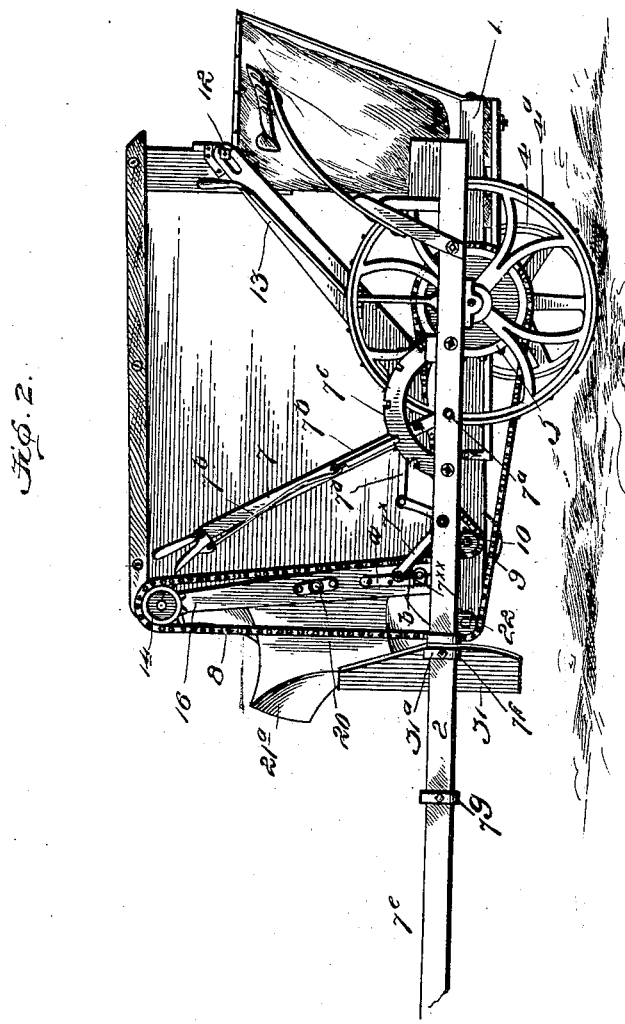

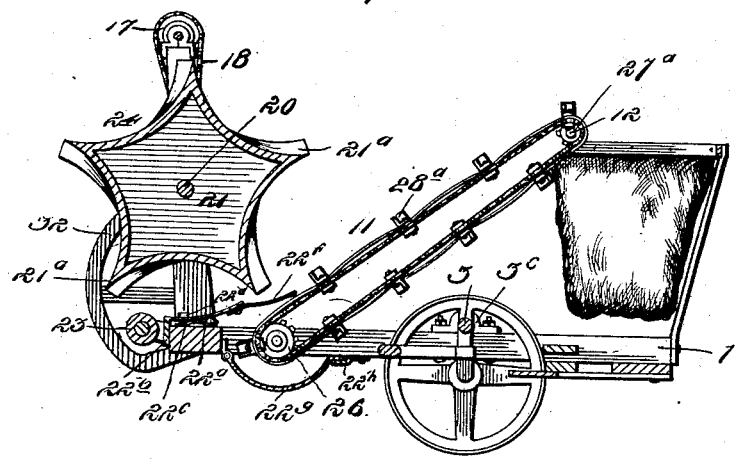

No. 692,456. Patented Feb. 4, 1902.
S. E. KIEROLF.
PEA HARVESTER.
(Application filed Oct. 11, 1900.)

(No Model.) 4 Sheets—Sheet 4.

Witnesses

Inventor
Salem E. Kierolf.
by Edron Bro's
Attorneys

UNITED STATES PATENT OFFICE.

SALEM E. KIEROLF, OF JACKSON, TENNESSEE.

PEA-HARVESTER.

SPECIFICATION forming part of Letters Patent No. 692,456, dated February 4, 1902.

Application filed October 11, 1900. Serial No. 32,753. (No model.)

*To all whom it may concern:*

Be it known that I, SALEM E. KIEROLF, a citizen of the United States, residing at Jackson, in the county of Madison and State of Tennessee, have invented certain new and useful Improvements in Pea-Harvesters; and I do hereby declare the following to be a full, clear, and exact description of the invention, such as will enable others skilled in the art to which it appertains to make and use the same.

My invention relates to certain improvements in what are termed pea "pickers" or "harvesters," while it is equally adapted as a clover-blossom harvester and for like purposes. In use it is effective for the intended purposes, expeditious in operation, simple in construction, and inexpensive.

It consists of the combination and arrangement of the parts, including their construction, substantially as hereinafter more fully disclosed, and specifically pointed out by the claims.

Latitude is allowed herein as to certain details, as they may be changed at pleasure without departing from the spirit of my invention and the same yet remain intact and be protected.

Figure 5:
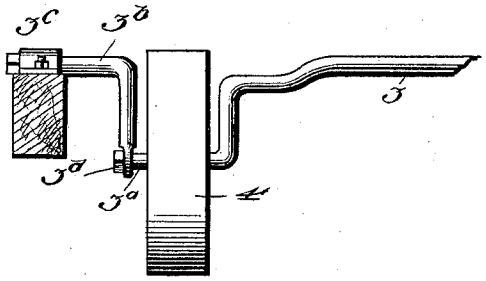
Figure 6:
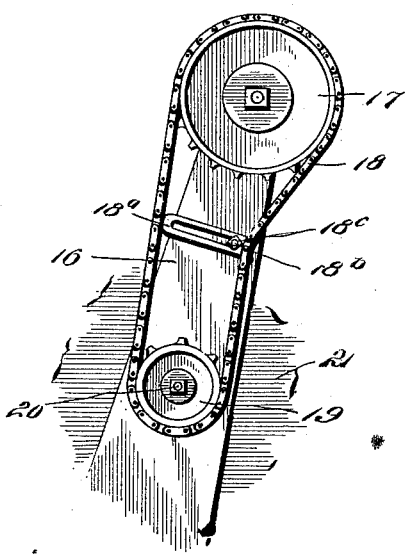
Figure 7:

In the accompanying drawings, Figure 1 is a plan view of a machine embodying my invention. Fig. 2 is a side view. Fig. 3 is a sectional elevation taken on the line $x\,x$ of Fig. 1. Fig. 4 is a detailed sectional view showing the pea-harvesting "cylinder" armed with additional blades, adapting it more particularly for harvesting clover-blossoms. Fig. 5 is an enlarged broken detailed view showing more especially the smaller or right-hand traveling wheel and axle. Fig. 6 is a similar view showing more particularly the belt-tightening device or slide, presently fully described. Fig. 7 is a detached perspective view of a blade to substitute the relieving-roll when the machine is used for harvesting clover-blossoms.

In carrying out my invention I provide a suitable frame 1, mounted, preferably, after the fashion of a grain dropper or harvester and provided with a stub-tongue 2. The double-cranked axle or shaft 3 of the transporting or carrying wheels 4 $4^a$, one ($4^a$) a master-wheel, has fixed on it under the platform or frame a driving sprocket-wheel 5, having a half-clutch 6, preferably of four teeth or pins, adapted to engage the spokes of the driving or master wheel $4^a$ to suitably transmit motion to said sprocket-wheel. The axle 3 has one end portion bent downward and then extended or terminated into the axle-arm proper, $3^a$, carrying the wheel 4, and bearing in the lower end of a bent axle-section $3^b$, suitably held in a boxing or cap $3^c$, secured to the machine-frame, said axle-arm having its terminal preferably held in the lower end of said axle-section by a nut $3^d$, all as seen in Fig. 3. This construction provides for the inequality between the master or main driving wheel $4^a$ and the small wheel 4 for the ready removal of said small wheel and for readily turning the machine. It is also observed that the main axle-section is secured rigidly to the stub-tongue, while the frame of the machine hangs from said axle-section, thus allowing said frame to be readily lowered and raised by suitable means, as will be presently made apparent.

The stub-tongue 2 is adapted to be raised or lowered by the usual spring pawl and ratchet armed lever 7. The lever 7 is pivoted at its lower end upon the stub-tongue, as at $7^a$, its pawl $7^b$ engaging the ratchet or rack $7^c$, secured to the stub-tongue. Said lever is connected by a link $7^d$ with a bell-crank $7^\times$, pivoted at its angle or elbow to the stub-tongue 2, said elbow or bell-crank being linked, as at $7^{\times\times}$, to a lateral arm of an angle-bracket $a$, preferably secured to a flail-cylinder-supporting upright, presently referred to. The link $7^{\times\times}$ is suitably held in place by a pin $b$, passed through apertures in the bent terminals thereof, preferably as shown. This arrangement provides for the ready tilting or raising and lowering, as occasion may require, of the forward end of the machine. The tongue $7^e$ proper is detachably connected to said stub-tongue, preferably by keepers or stirrups $7^f$ $7^g$, attached to said stub-tongue and tongue proper, respectively, to provide for the removal of the tongue proper with the whiffletrees, as preferably desired, as will be readily appreciated. A motion-transmitting chain belt 8, engaging and driven by the sprocket-wheel 5, also engages a sprocket wheel or pulley 9 on a shaft 10, suitably hung on the frame or platform 1, encompassed by and driving an endless apron or elevator 11. This elevator also encompasses at its upper end a second shaft 12, suitably hung in upward and rearward inclined supports 13 to properly deliver the peas or other harvested "crop," said supports being secured at their lower ends to the frame 1. The chain belt 8 is next caused to engage a sprocket-pulley 14 on one end of the shaft 15, suitably hung in uprights 16, upon whose opposite end is a second sprocket-pulley 17, engaged by an endless chain belt 18, also engaging a second sprocket-pulley 19, carried by the shaft 20, hung in the frame 1 and carrying a cylinder 21, armed with slightly spiral or oblique blades or flails 21$^a$ and arranged above said frame or platform, said cylinder-shaft also passing through the uprights 16. The oblique or spiral blades or flails 21$^a$ are formed integrally with the cylinder, their spirality or obliquity extending in the direction of the length or longitudinally of the cylinder, while they taper radially or transversely outward, and intermediately of said blades or flails the surface of said cylinder is concaved, thus providing a series of concavities or spaces therebetween, as more clearly disclosed by Fig. 3, for the purpose hereinafter indicated. The chain 18 has connected to it one end of a slack compensating or tightening device or slide 18$^a$, having an elongated slot therein engaged by a holding or adjusting screw 18$^b$, with its nut 18$^c$ adapted to engage said slide, the operation of which is obvious. Said chain belt 8 is further caused to engage and drive a sprocket-pulley 22 on one end of the "relieving-roller" 23, hung in the forward end of the frame or platform 1, providing a rolling bearing or surface at this point for the vines as they contact therewith when engaged by the flails or blades of the cylinder 21, turning toward said frame or platform in harvesting the peas, &c. The rolling bearing or roll 23 and the flail-cylinder 21 turning counter-clockwise, (shown in Fig. 3,) said roll is caused to aid the passing of the vines relieved of their pods by the flails or blades under the machine out of the way, as will be readily understood. This roll or bearing also relieves the machine of the additional draft or resistance which would otherwise be exerted thereon; also, aids the discharge of the vines after the pea-pods have been flailed therefrom. The intermediate concaved spaces 24 between the flails or blades 21$^a$ of the cylinder serve to prevent the pea-pods rolling off the cylinder as they are detached from the vines until their proper delivery upon the apron or elevator 11, finally delivering said pea-pods from the machine. The chain or belt 8, being endless, passes from the sprocket-pulley 22 back to and continues to engage the sprocket-wheel 5, and so on.

A presser-plate 22$^a$, having its upper surface curved to conform to an arc of the general circle described by the rotation of the cylinder 21 and having its forward edge portion 22$^b$ extending a suitable distance down opposite the corresponding edge of the platform or frame of the machine, is arranged directly under said cylinder and has secured to its under side at proper intervals apart approximately semi-elliptic or bowed springs 22$^c$, resting upon said frame to effect the holding of said presser-plate normally about an eighth of an inch from the path described by the blades or flails of said cylinder. The purpose of said presser-plate is to provide for relieving the vines as the cylinder flails or blades are removing or detaching the pods therefrom, and thus prevent the breaking of the vines, as would otherwise be liable to occur. The presser-plate 22$^a$ is itself held in place by suitable means—as, for instance, screw-bolts 22$^d$, engaging the frame and passing through slots in said plate, with their outer headed ends adapted to serve as stops to limit the outward movement of said plate under the action of the springs 22$^c$ to the above-stated predetermined point. Said presser-plate has attached to its upper rear edge an apron or extension 22$^f$, resting at its upper free edge upon the elevator or apron 11, to conduct the pea-pods to and provide for the ready elevation of said pea-pods therefrom by said elevator.

A preferably downward curved guard or shield 22$^g$, having one edge hinged to the rear edge of the forward cross-bar of the machine-frame and its opposite edge retained by a button or catch 22$^h$, pivoted to the under side of said frame, is arranged just beneath or opposite the lower end of the apron or elevator 11 to prevent interference therewith of the vines, &c. Its hinge connection with said cross-bar permits the swinging thereof downward to allow of the removal or dumping of any peas, &c., falling therein.

A lever 30, suitably fulcrumed to the frame or platform by a bracket 30$^a$, provides for shipping the driving-belt clutch mechanism.

A forwardly deflected or inclined fender or guard 31 is applied to the stub-tongue 2, its inner edge having secured thereto a keeper or stirrup 31$^a$, fitted and suitably held upon said stub-tongue, said guard or shield being arranged in alinement with the power-transmitting chain 18 to prevent the interference therewith of the vines, &c.

Also applied to the forward end of the machine-frame at its right-hand side is a deflector or "divider" 32 with its outer surface inclined outward and rearward to laterally deflect the vines not in the direct path of the machine and which are to be engaged by the flailing-cylinder, which would otherwise intercept the proper operation of the machine.

It will be noticed that the bottom elevator or apron shaft has two fixed sprocket-wheels 26, one near each end, and the upper shaft thereof has similar idle sprocket-wheels 27$^a$, as shown, which are fixed by nuts. The elevator-apron itself is also suitably equipped with cups 28$^a$ or other suitable means to aid the same to carry or elevate the pea-pods or blossom-seeds delivered thereon. Said "cups" or equipments are preferably angular, with one arm of the angle secured in any suitable way to the apron or elevator.

For harvesting clover-blossoms I suitably provide for attaching to the flailing blades or ribs 21ª of the cylinder 21 a corresponding number of additional blades 27 and substitute for the relieving-roll 23 a fixed blade 28, adapted to coact with said additional blades, said fixed blade being suitably secured or fastened at the forward edge of the machine, all as shown in Fig. 4, for the purpose as aforesaid.

Having thus fully described my invention, what I claim as new, and desire to secure by Letters Patent, is—

1. In a machine of the character described, the "flailing-cylinder" having a series of peripheral blades or flails, and a roll arranged at the forward edge of the machine, both said cylinder and roll having their upper surfaces turning forward, and said cylinder lying above the passage of the objects acted upon, and said roll lying below said passage, substantially as set forth.

2. In a machine of the character described, the "flailing-cylinder" having a series of peripheral oblique or spiral blades or flails, and a roll arranged at the forward edge of the machine, both said cylinder and roll having their upper surfaces turning forward, and said cylinder lying above the passage of the objects acted upon, and said roll lying below said passage, substantially as set forth.

3. In a machine of the character described, the flailing or threshing cylinder having a series of peripheral oblique or spiral blades or flails, tapered at their outer longitudinal edges, both said cylinder and roll having their upper surfaces turning forward and said cylinder lying above the passage of the objects acted upon, and said roll lying below said passage, substantially as set forth.

4. In a machine of the character described, the flailing or threshing cylinder having a series of peripheral blades, and a series of concavities between said blades, and a roll arranged at the forward edge of the machine, both said cylinder and roll having their upper surfaces turning forward and said cylinder lying above the passage of the object acted upon, and said roll lying below said passage, substantially as set forth.

5. In a machine of the character described, a flailing or threshing cylinder having peripheral blades, a roll arranged at the forward edge of the machine, and an apron or elevator, both said cylinder and roll having their upper surfaces turning forward and said cylinder lying above the passage of the object acted upon, and said roll lying below said passage, substantially as set forth.

6. In a machine of the character described, a flailing or threshing cylinder having a series of peripheral oblique or spiral blades or flails tapered transversely or radially, a yielding presser-plate arranged under said cylinder, and a roll arranged at the forward edge of said machine, both said cylinder and roll having their upper surfaces turning forward and said cylinder lying above the passage of the object acted upon and said roll lying below said passage, substantially as set forth.

7. In a machine of the character described, a flailing or threshing cylinder having peripheral oblique blades, a spring presser-plate arranged under said cylinder, and a roll arranged at the forward edge of the machine, both said cylinder and roll having their upper surfaces turning forward, and said cylinder lying above the passage of the object to be acted upon and said roll lying below said passage, substantially as set forth.

8. In a machine of the character described, the combination of the machine-apron a flailing-cylinder and a spring presser-plate arranged under said cylinder, with its forward edge extended or bent down, opposite the forward edge of the machine-frame, said presser-plate having a rearward extension or apron resting upon the machine-apron, substantially as set forth.

9. In a machine of the character described, a flailing or threshing cylinder having peripheral oblique blades, a series of additional blades secured to the first-named blades, and a roll arranged at the forward edge of the machine, both said cylinder and roll having their upper surfaces turning forward, and said cylinder lying above the passage of the object acted upon, and said roll lying below said passage, substantially as set forth.

In testimony whereof I affix my signature in presence of two witnesses.

SALEM E. KIEROLF.

Witnesses:
A. J. McGEHEE,
JOHN MAGEVNEY.